Jan. 30, 1968  E. F. BJORK  3,366,395

SLED

Filed June 16, 1965  2 Sheets-Sheet 1

INVENTOR
ELDON F. BJORK
BY Dick, Zarley, McKee & Thomte
ATTORNEYS

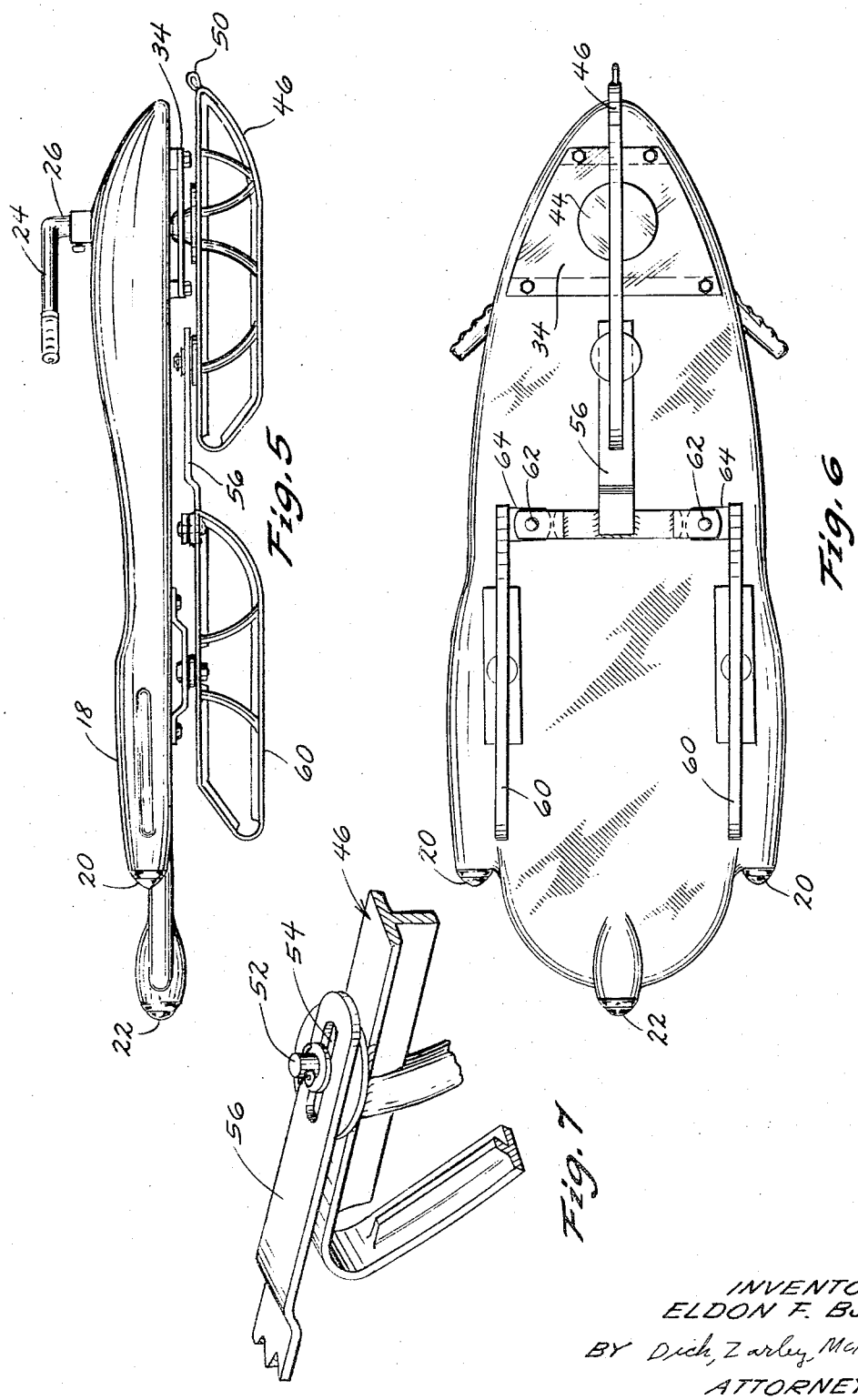

United States Patent Office 3,366,395
Patented Jan. 30, 1968

3,366,395
SLED
Eldon F. Bjork, 3204 Wright St.,
Des Moines, Iowa 50316
Filed June 16, 1965, Ser. No. 464,357
1 Claim. (Cl. 280—16)

This invention relates to a vehicle and in particular to a sled.

It is one of the principal objects of this invention to provide a sled having a steering system which will give superior control of the vehicle for greater maneuverability.

It is a related object of this invention to provide a sled having a support system which fully functions in the steering of the vehicle.

A still further related object of this invention is to provide a vehicle having a support system including a pair of rear supports which turn in unison with a front support but in opposite directions.

Another related object of this invention is to provide a sled having a pair of rear runners which are interconnected to maintain the same relative relationship therebetween at all times and are in turn interconnected to a single front sled runner which may be manually steered and is adapted to turn in the opposite direction from the rear sled runners.

A still further important object of this invention is to provide a vehicle of the sled type which has a top supporting surface which is dished out to provide an improved supporting surface for the driver of the sled.

Another important object of this invention is to provide a sled having a very modernistic overall appearance.

A related object of this invention is to provide a sled having a crossbar as a steering means for controlling the turning of the front sled runner.

It is a further specific object of this invention to provide a sled having a support system consisting of three sled runners, two in the rear and one in the front.

A further object of this invention is to provide a sled which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

In FIG. 1 of the drawings the sled vehicle of this invention;

FIG. 5 is a side elevation view of the sled vehicle;

FIG. 6 is a bottom plan view of the sled vehicle; and

FIG. 7 is a fragmentary perspective view of the connection between the linkage interconnecting the crossbar on the rear sled runners to the front sled runner.

Figure 1:
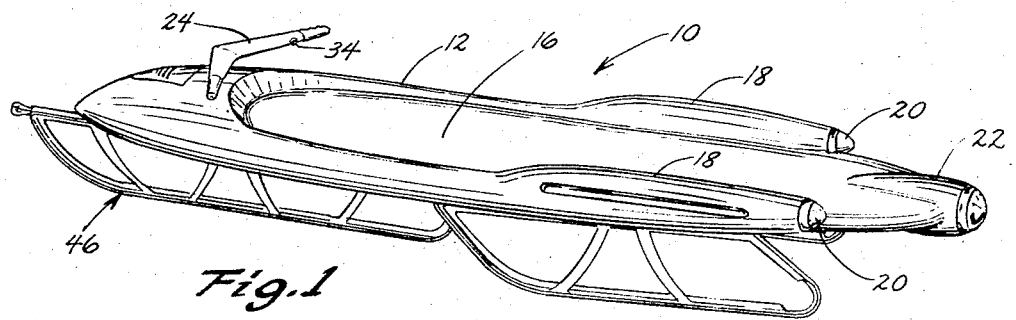
Figure 2:
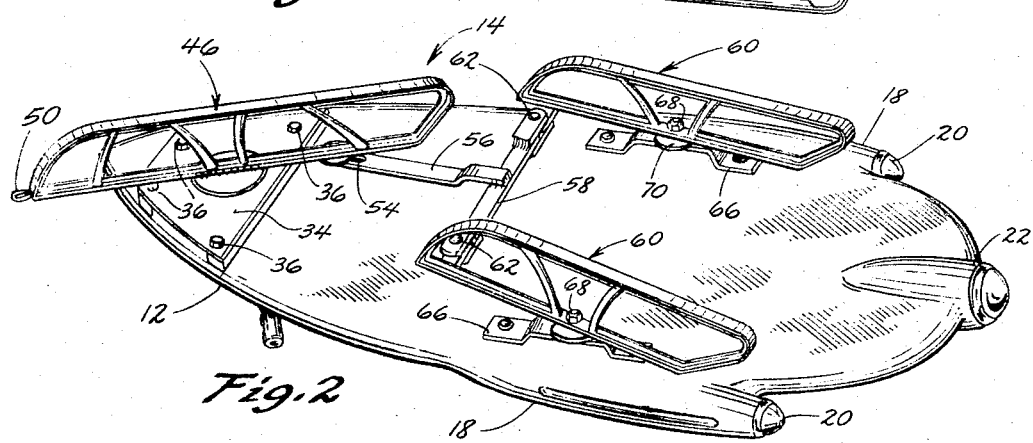
FIG. 2 is a bottom perspective view of the sled showing in particular the supporting and steering system.

In FIG. 1 of the drawings the sled vehicle of this invention is referred to generally by the reference numeral 10 and has a body frame 12 carried on a support and steering system generally referred to in FIG. 2 by the reference numeral 14.

The body frame 12 as best seen in FIG. 1 is very streamline in appearance and includes a dished out top side 16 for the driver of the sled. A pair of enlarged shoulders 18 are provided on opposite sides of the top side 16 and cooperate to help define the side walls of the dished out top side. A pair of tail lights 20 are disposed in the rear ends of the shoulders 18. A third tail light 22 is provided in the center of the body 12 at the rear end.

At the front end of the sled body 12, a steering member 24 is provided and disposed in a horizontal plane for rotation about a vertical axis coaxial with a shaft member 26 connected by a bolt 28 to a sleeve 30 disposed vertically within the body 12 of the sled.

A door 32 has been provided in the forward end of the sled body 12, and gives access to a chamber for storage of batteries or the like for powering the lights 20 and 22 and additionally a horn if desired which has a switch 34 for its operation on the steering member 24 (FIG. 1).

Figure 3:
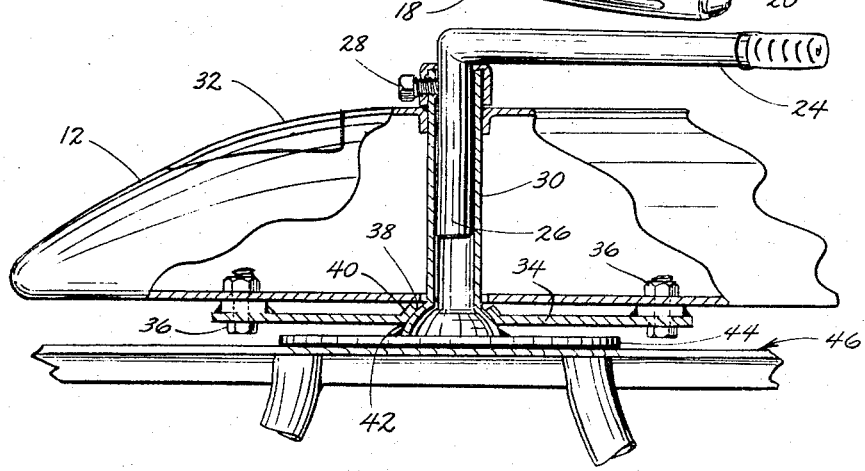
FIG. 3 is a fragmentary side elevation view of the front sled runner and the steering mechanism as it is connected to the sled frame.

The bottom side of the sled 12 is provided at its forward end with a reinforcing plate 34 connected thereto by bolts 36. On the longitudinal axis of the sled body 12, an opening 38 is formed by an upwardly and inwardly extending annular flange 40 formed on the reinforcing plate 34 as seen in FIG. 3. The sleeve 30 terminates at its lower end in a flared out or convex annular portion 42 which is adapted to matingly engage the annular concave flange 40. A circular plate element 44 is secured by weldments to the outer peripheral edge of the convex portion 42 and in turn has a sled runner 46 welded on its opposite side. Thus it is seen that the sled runner 46 is adapted to pivot about the vertical axis extending through the shaft 26 and the sleeve 30 when operated by the steering member 24. Also, from FIGS. 1, 2, 5 and 6 it is seen that the sled runner 46 which is the front steering runner extends forwardly of the frame 12 at its front end and rearwardly along the longitudinal center axis of the sled to a point short of its center area.

Figure 4:
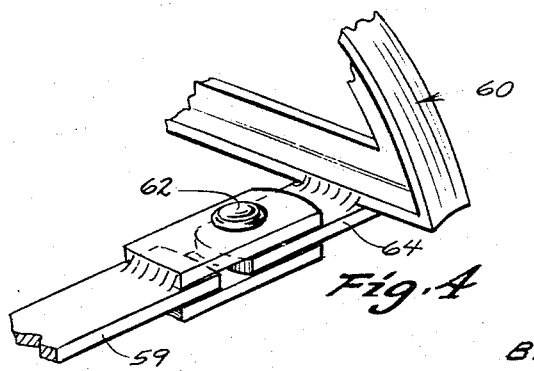
FIG. 4 is a fragmentary perspective view of the crossbar and one of its connections to one of the two rear runners.

An eye element 50 is provided on the top front end of the front sled runner 46 for towing the sled or the like. As seen in FIG. 7, a vertical pin 52 is provided on the sled runner 46 near its rear end and is received in a slot 54 formed longitudinally of a linkage plate element 56 which extends rearwardly of the sled body 12 where it is connected rigidly to a cross member 58 pivotally interconnecting a pair of sled runners 60 at their forward ends (FIG. 4). A conventional cotter key and washer maintain the plate linking member 56 on the pin 52 as it moves the length of the slot 54. Similarly, a pin 62 is provided at each end of the cross member 58 for making the pivotal connection to the sled runners 60 through an inwardly extending plate portion 64 (FIG. 6). As seen in FIG. 2, the two rear sled runners 60 operate in unison and are in parallel relationship with each other. A pair of brackets 66 are bolted to the bottom side of the body 12 and pivotally connect the rear sled runners 60 thereto by a pair of bolts 68. A washer 70 is mounted on each of the bolts 68 and disposed between the top of the sled runners 60 and the bottom side of the brackets 66.

In operation, it is seen that superior control of the steering for the sled is provided by the three sled runners, the front sled runner 46 and the two rear sled runners 60. As the front sled runner 46 is turned from side to side, the pin 52 carried thereon moves longitudinally of the sled in the slot 54 formed in the linkage plate member 56 and transfers all lateral displacement to the rear sled runners 60 through the crossbar 58.

It is to be noted that the body 12 of the sled may be formed from fiberglass material or the like.

Some changes may be made in the construction and arrangement of my sled without departing from the real spirit and purpose of my invention, and it is my intention to cover by my claims, any modified forms of structure or use of mechanical equivalents which may be reasonably included within their scope.

I claim:
1. A sled comprising,
an elongated body supporting frame having front and rear ends and top and bottom sides,
a single sled runner pivotally secured to the bottom side adjacent the front end of said frame,
a pair of spaced apart sled runners pivotally secured to the bottom side adjacent the rear end of said frame,
steering means on the top side of said sled operatively connected to said front runner at a point on the axis of rotation of said front runner,
and link means interconnecting said pair of sled runners at the rear end and said single sled runner at the front end for all of said sled runners to turn together, said front sled runner turning in the opposite direction of said rear sled runners, and said connection of said link means to the rear end of said single front sled runner being substantially remote and rearwardly of the axis of rotation of said single sled runner;
said link means interconnecting the front ends of said pair of sled runners including a cross member pivotally interconnecting said rear pair of sled runners whereby said pair of rear sled runners are maintained in the same angular relationship, and said front sled runner is pivotally connected at one end by a link member having its opposite end rigidly connected to said cross member, said link member and said front sled runner including extension means whereby said front sled runner and said link member may be extended and contracted relative to each other as said front sled runner is turned;
said front sled runner having an upstanding shaft rigidly secured thereto and extending through the body supporting frame, and said steering means being connected to said shaft, said steering means being further defined as a horizontally disposed elongated member secured intermediate its ends to said shaft;
said body supporting frame provided with a bearing plate having an opening formed therein, said opening being formed by an annular upwardly and inwardly extending flange, a convex bearing portion on said shaft for mating engagement with said flange;
said link member having an elongated longitudinally extending slot in its forward end and an upstanding pin is rigidly mounted on the rear end of said single front runner and extending through said elongated slot;
said top side of said body supporting frame including an elongated recessed area open at the rear end and closed at the front end with upstanding longitudinal side edges, said steering means being forwardly of and adjacent to the forward closed end of said recessed area and dished out in shape to receive a person's body.

References Cited
UNITED STATES PATENTS

| | | | |
|---|---|---|---|
| 529,494 | 11/1894 | Holt | 280—16 |
| 1,318,747 | 10/1919 | Gross | 280—16 |
| 2,859,979 | 11/1958 | Himes | 280—279 |

LEO FRIAGLIA, *Primary Examiner.*

MILTON BUCHLER, *Examiner.*

L. D. MORRIS, *Assistant Examiner.*